US012451655B2

(12) United States Patent
Fan et al.

(10) Patent No.: US 12,451,655 B2
(45) Date of Patent: Oct. 21, 2025

(54) ELECTRICAL CONNECTOR AND CABLE CONNECTOR WITH IMPROVED GROUNDING

(71) Applicant: Luxshare Precision Industry Company Limited, Shenzhen (CN)

(72) Inventors: Min Fan, Shenzhen (CN); Yingbin Pu, Shenzhen (CN); Cunting Huang, Shenzhen (CN)

(73) Assignee: LUXSHARE PRECISION INDUSTRY COMPANY LIMITED, Shenzhen (CN)

( * ) Notice: Subject to any disclaimer, the term of this patent is extended or adjusted under 35 U.S.C. 154(b) by 403 days.

(21) Appl. No.: 18/110,137

(22) Filed: Feb. 15, 2023

(65) Prior Publication Data

US 2024/0128691 A1 Apr. 18, 2024

(30) Foreign Application Priority Data

Oct. 18, 2022 (CN) ......................... 202211272077.5

(51) Int. Cl.
*H01R 13/6592* (2011.01)
*H01R 13/115* (2006.01)
(Continued)

(52) U.S. Cl.
CPC ....... *H01R 13/6592* (2013.01); *H01R 13/115* (2013.01); *H01R 24/60* (2013.01); *H01R 2107/00* (2013.01)

(58) Field of Classification Search
CPC ............ H01R 13/6592; H01R 13/6581; H01R 13/6585; H01R 13/115; H01R 13/502; H01R 13/6593; H01R 24/60
(Continued)

(56) References Cited

U.S. PATENT DOCUMENTS

| | | | | |
|---|---|---|---|---|
| 10,700,455 | B1 * | 6/2020 | Shen | H01R 13/502 |
| 11,381,038 | B1 * | 7/2022 | Patel | H01R 13/65914 |

(Continued)

FOREIGN PATENT DOCUMENTS

| | | | |
|---|---|---|---|
| CN | 112636094 | A | 4/2021 |
| CN | 213071650 | U | 4/2021 |
| JP | 2020-524876 | A | 8/2020 |

OTHER PUBLICATIONS

Korean Office Action for Korean Application No. 20-2023-0000583, dated Aug. 21, 2024, with English translation.

*Primary Examiner* — Abdullah A Riyami
*Assistant Examiner* — Amara Anderson
(74) *Attorney, Agent, or Firm* — Birch, Stewart, Kolasch & Birch, LLP

(57) ABSTRACT

Provided are an electrical connector and a cable connector. The electrical connector includes a terminal module and a shielding housing. The terminal module includes a conductive module and a grounding sheet. One end of the conductive module is configured to connect a docking conductive terminal of a docking connector, and another end of the conductive module is configured to connect a core wire of a cable. The shielding housing includes a first housing and a grounding connection member integrally formed with the first housing. The first housing is disposed on the outer side of the terminal module. One end of the grounding sheet abuts against the inner wall of the first housing. The other end of the grounding sheet is configured to connect a docking grounding terminal of the docking connector. The grounding connection member is configured to connect a shielding layer of the cable.

14 Claims, 7 Drawing Sheets

(51) Int. Cl.
*H01R 24/60* (2011.01)
*H01R 107/00* (2006.01)

(58) Field of Classification Search
USPC .................................................. 439/660, 676
See application file for complete search history.

(56) References Cited

U.S. PATENT DOCUMENTS

2005/0112920 A1* 5/2005 Venaleck ........... H01R 13/6593
439/92
2010/0221933 A1* 9/2010 Wu .................... H01R 13/6581
439/98
2020/0119496 A1* 4/2020 Zhang ................ H01R 13/6658
2022/0123509 A1* 4/2022 Li .................... H01R 13/65918

* cited by examiner

ELECTRICAL CONNECTOR AND CABLE CONNECTOR WITH IMPROVED GROUNDING

CROSS-REFERENCE TO RELATED APPLICATION(S)

This application claims priority to Chinese Patent Application No. 2022112720775 filed Oct. 18, 2022, the disclosure of which is incorporated herein by reference in its entirety.

TECHNICAL FIELD

The present disclosure belongs to the field of signal transmission technology and, in particular, relates to an electrical connector and a cable connector.

BACKGROUND

The existing electrical connector assembly includes an electrical connector and a corresponding docking connector. A signal cable connector and a power cable connector may be integrated together, so that the electrical connection including audio-visual signal transmission and power transmission between a video source device (such as a computer and a game console) and a display device (such as a display and a projector) is implemented through a cable. The ability of shielding interference during data transmission determines the quality of signal transmission of an electrical connector.

In the existing cable connector, for example, the cable connector provided in the previous patent application No. CN101011332765.7, a shielding sheet is disposed in a first shielding housing. The shielding sheet is made of a metal material and is a one-piece structure. An end of the shielding sheet is interference-fitted into a first notch and a second notch of the first shielding housing. In this manner, the electrical connection between the shielding sheet and the first shielding housing is implemented, thereby increasing a grounding area and improving the shielding effect.

However, since the first shielding housing of the cable connector is formed with the first notch and the second notch, the contact wall of a notch contacting the shielding sheet is easy to deform and warp. As a result, the contact between the notch and the shielding sheet is poor. Thus, the shielding effect is affected.

SUMMARY

The object of the present disclosure is to provide an electrical connector and a cable connector to solve the technical problem existing in the related art that a shielding housing and a shielding sheet are easily in poor contact with each other, thereby affecting the shielding effect.

To achieve this object, the present disclosure adopts the technical solutions below.

The electrical connector includes a terminal module and a shielding housing.

The terminal module includes a conductive module and a grounding sheet. One end of the conductive module is configured to connect a docking conductive terminal of a docking connector, and another end of the conductive module is configured to connect a core wire of a cable.

The shielding housing includes a first housing and a grounding connection member integrally formed with the first housing. The first housing is disposed on the outer side of the terminal module. One end of the grounding sheet abuts against the inner wall of the first housing. The other end of the grounding sheet is configured to connect a docking grounding terminal of the docking connector. The grounding connection member is configured to connect a shielding layer of the cable.

In a preferred technical solution of the preceding electrical connector, the grounding connection member includes a first connection portion and a second connection portion. One end of the first connection portion is connected to the first housing, and the other end of the first connection portion extends towards the inside of the first housing and is connected to the second connection portion. The second connection portion is configured to connect the shielding layer of the cable.

In a preferred technical solution of the preceding electrical connector, the grounding connection member includes two first connection portions. The second connection portion is in a U-shaped structure. Two ends of the U-shaped structure are connected to the two first connection portions in a one-to-one correspondence.

In a preferred technical solution of the preceding electrical connector, the conductive module is formed with an accommodating groove. The second connection portion is accommodated in the accommodating groove.

In a preferred technical solution of the preceding electrical connector, the grounding connection member also includes multiple positioning portions. The positioning portions are connected to the end of the second connection portion away from the first connection portion. Multiple positioning grooves are formed in the groove bottom of the accommodating groove. The multiple positioning portions are disposed in the multiple positioning grooves in a one-to-one correspondence.

In a preferred technical solution of the preceding electrical connector, the grounding sheet includes a main body portion, multiple grounding terminals, and two elastic abutment portions.

One end of one grounding terminal is connected to one side of the main body portion, and the other end of the one grounding terminal is configured to connect the docking grounding terminal of the docking connector. The multiple grounding terminals are sequentially distributed at intervals.

The two elastic abutment portions are disposed at two ends of the other side of the main body portion facing away from the one grounding terminal separately and elastically abut against two opposite inner walls of the first housing separately.

In a preferred technical solution of the preceding electrical connector, one end of each of the two elastic abutment portions is connected to the main body portion, and the other end of each elastic abutment portion extends obliquely in a direction in which one elastic abutment portion faces away from the other elastic abutment portion.

In a preferred technical solution of the preceding electrical connector, multiple first positioning holes are formed in the main body portion. Multiple first positioning pins are disposed on the terminal module. The multiple first positioning pins are disposed in the multiple first positioning holes in a one-to-one correspondence.

In a preferred technical solution of the preceding electrical connector, the first housing includes a sleeve structure and an extension plate. The sleeve structure includes a first side plate and a second side plate disposed opposite to each other. The extension plate is connected to an end of the first side plate. The grounding connection member is connected to the end of the second side plate adjacent to the extension plate. The conductive module extends from the inside of the sleeve structure to a side of the extension plate.

The cable connector includes a cable and the preceding electrical connector. A shielding layer of the cable is connected to the grounding connection member of the electrical connector. A core wire of the cable is connected to the conductive module of the electrical connector.

The beneficial effects of the present disclosure are described below.

The present disclosure provides an electrical connector. In the electrical connector, one end of the conductive module is configured to connect the docking conductive terminal of the docking connector, and the other end of the conductive module is configured to connect the core wire of the cable. In this manner, data transmission is implemented. One end of the grounding sheet abuts against the inner wall of the first housing. The other end of the grounding sheet is configured to connect the docking grounding terminal of the docking connector. The first housing is connected to the grounding connection member. The grounding connection member is configured to connect the shielding layer of the cable, which plays the role of grounding and interference shielding. The first housing is integrally formed with the grounding connection member, and the connection strength is high. The grounding sheet abuts against the inner wall of the first housing. In this manner, a notch does not need to be formed as in the related art. Thus, the reliability of the connection between the grounding sheet and the shielding housing is ensured, so that the grounding shielding effect is better.

The present disclosure also provides a cable connector. The cable connector includes the preceding electrical connector and a cable connected to the electrical connector. Due to the disposition of the electrical connector, the cable connector provided by the present disclosure ensures the reliability of the connection between the grounding sheet and the shielding housing, so that the grounding shielding effect is better.

BRIEF DESCRIPTION OF DRAWINGS

To illustrate the solution in embodiments of the present disclosure more clearly, the drawings used in description of the embodiments of the present disclosure are briefly described below. Apparently, the drawings described below merely illustrate part of the embodiments of the present disclosure, and those of ordinary skill in the art can also obtain other drawings based on the contents in the embodiments of the present disclosure and these drawings on the premise that no creative work is done.

REFERENCE LIST

Figure 1:
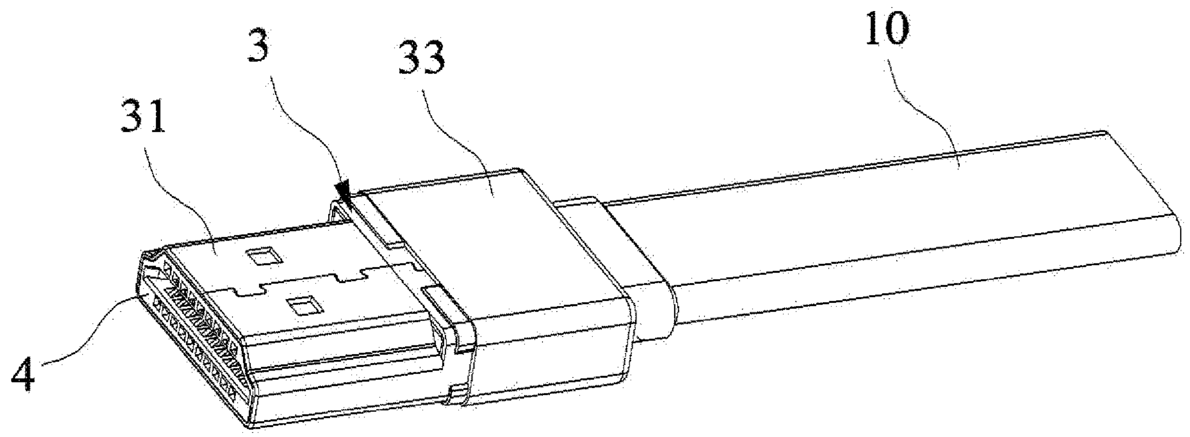
FIG. 1 is a view illustrating the structure of a cable connector according to an embodiment of the present disclosure.

10 cable
101 shielding layer
102 core wire
103 inner insulating layer
104 outer insulating layer
2 terminal module
3 shielding housing
4 insulator
22 grounding sheet
31 first housing
32 grounding connection member
33 second housing
41 first positioning protrusion
42 second positioning groove
43 mounting through groove
44 gap
211 first module
212 second module
221 main body portion
222 grounding terminal
223 elastic abutment portion
312 extension plate
321 first connection portion
322 second connection portion
323 positioning portion
2111 first insulating fixed block
2112 first conductive terminal
2113 second positioning protrusion
2121 second insulating fixed block
2122 second conductive terminal
2123 accommodating groove
2124 positioning groove
2125 first positioning pin
2211 first positioning hole
3111 first side plate
3112 second side plate
3113 first positioning groove

DETAILED DESCRIPTION

Embodiments in accordance with the present disclosure are described in detail below. Examples of the embodiments are illustrated in the drawings, where the same or similar reference numerals indicate the same or similar elements or components having the same or similar functions. The embodiments described hereinafter with reference to the drawings are merely exemplary. The embodiments are intended to explain the present disclosure and are not to be construed as limiting the present disclosure.

In the description of the present disclosure, unless otherwise expressly specified and limited, the term "connected to each other", "connected" or "installed" is to be construed in a broad sense, for example, as installed connected or detachably connected; mechanically connected or electrically connected; directly connected to each other or indirectly connected to each other via an intermediary; or internally connected between two elements or interactional relations between two elements. For those of ordinary skilled in the art, the preceding terms can be construed according to specific circumstances in the present disclosure.

In the description of the present disclosure, unless otherwise expressly specified and limited, when a first feature is described as "on" or "below" a second feature, the first feature and the second feature may be in direct contact or be in contact via another feature between the two features instead of being in direct contact. Moreover, when the first feature is described as "on", "above" or "over" the second feature, the first feature is right on, above or over the second feature or the first feature is obliquely on, above or over the second feature, or the first feature is simply at a higher level than the second feature. When the first feature is described as "under", "below", or "underneath" the second feature, the first feature is right under, below, or underneath the second feature or the first feature is obliquely under, below, or underneath the second feature, or the first feature is simply at a lower level than the second feature.

Technical solutions of the present disclosure are further described hereinafter in conjunction with the drawings and the embodiments.

As shown in FIG. 1, an embodiment provides a cable connector. The cable connector includes a cable 10 and an electrical connector connected to an end of the cable 10. The shielding effect of the electrical connector is good, thereby ensuring the data transmission effect of the cable connector.

Figure 3:
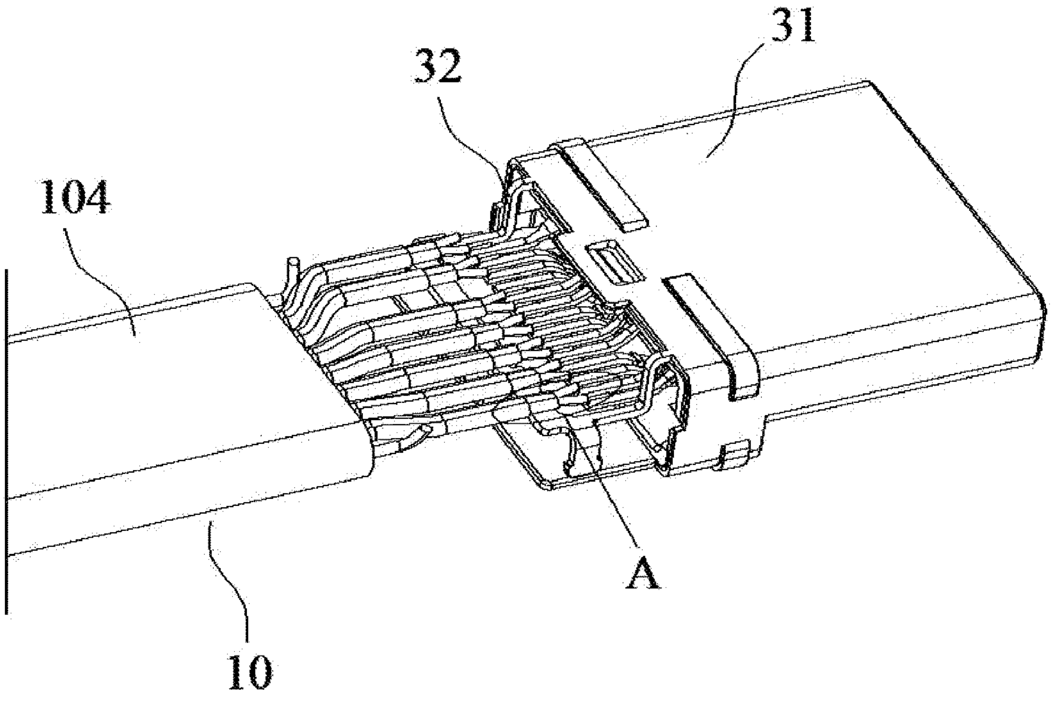
FIG. 3 is a view illustrating the structure of the cable connector after a second housing, a first insulating fixed block, and a second insulating fixed block are hidden according to an embodiment of the present disclosure.
Figure 4:
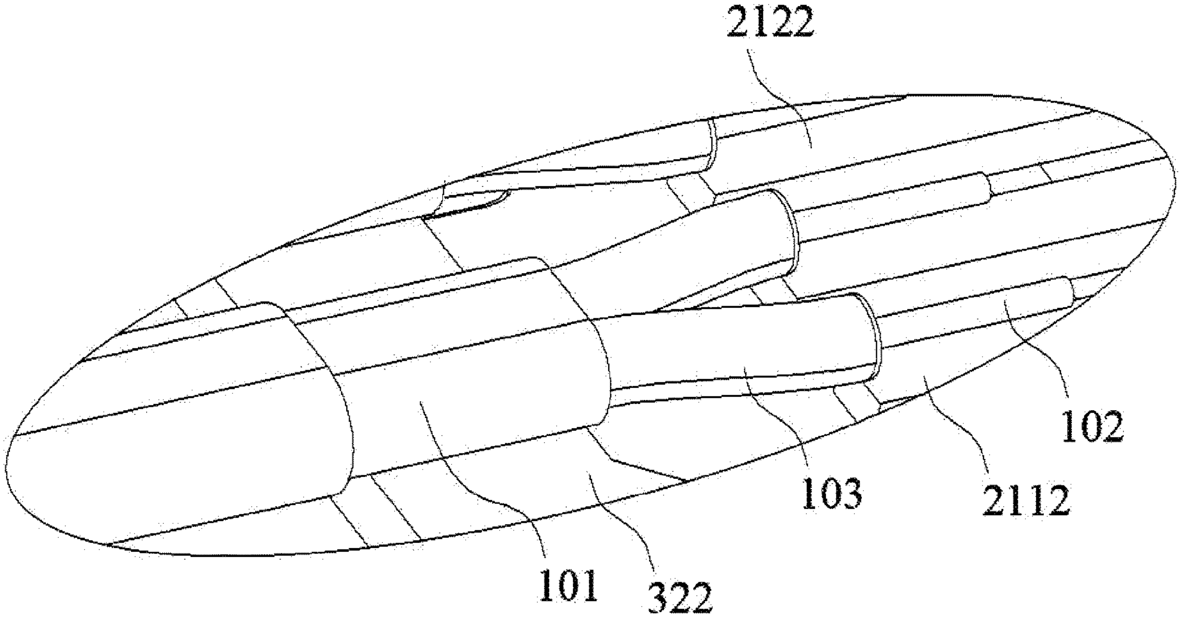
FIG. 4 is an enlarged view of part A of FIG. 3.

In an embodiment, as shown in FIGS. 3 and 4, the cable 10 includes a core wire 102, an inner insulating layer 103, a shielding layer 101, and an outer insulating layer 104. The inner insulating layer 103 sleeves the outer side of the core wire 102. The shielding layer 101 sleeves the outer side of the inner insulating layer 103. The outer insulating layer 104 sleeves the outer side of the shielding layer 101.

Figure 2:
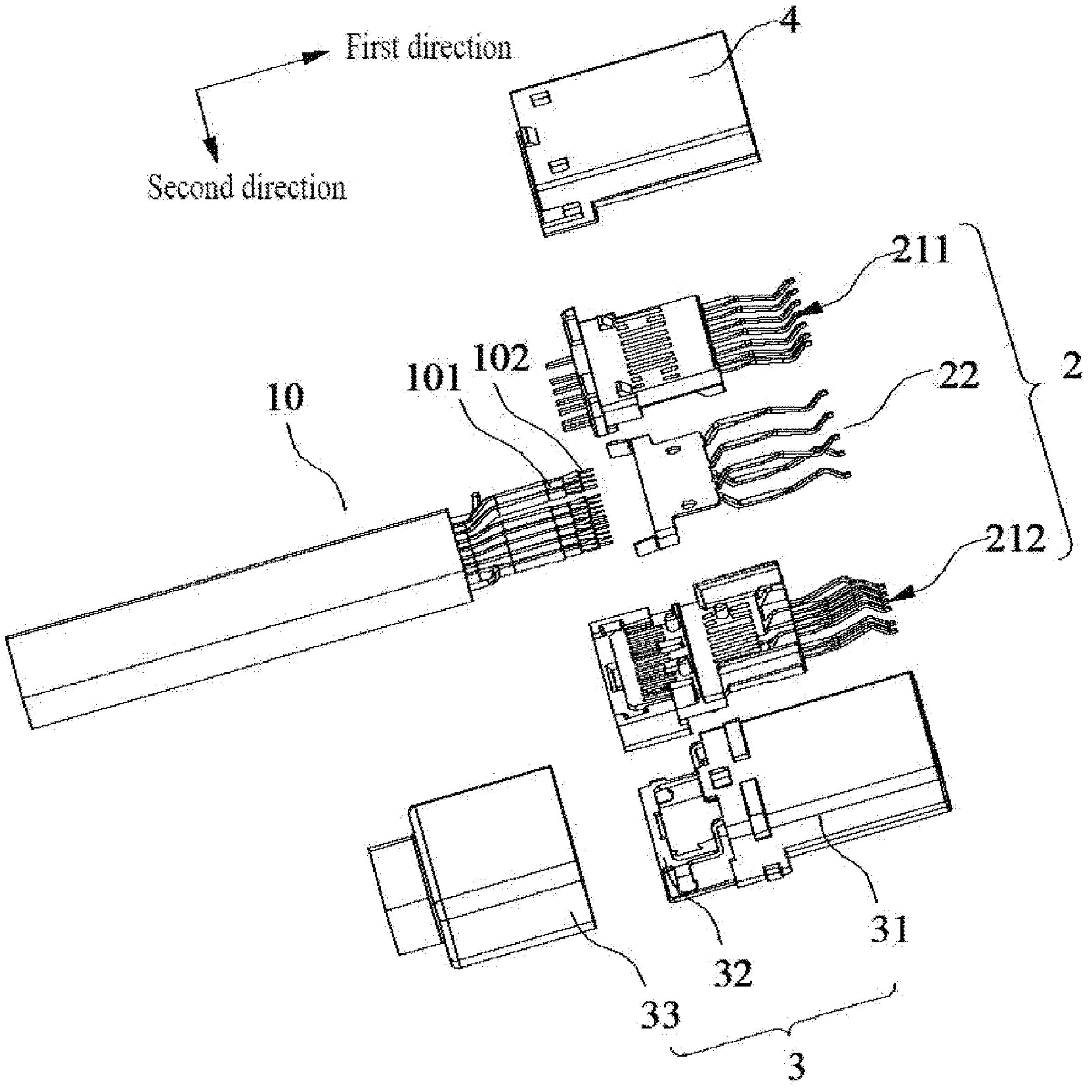
FIG. 2 is an exploded view of the cable connector according to an embodiment of the present disclosure.

As shown in FIG. 2, the electrical connector provided in this embodiment includes a terminal module 2 and a shielding housing 3. The terminal module 2 includes a conductive module and a grounding sheet 22. One end of the conductive module is configured to connect a docking conductive terminal of a docking connector (not shown in the figure), and the other end of the conductive module is connected to the core wire 102 of the cable 10. The shielding housing 3 includes a first housing 31 and a grounding connection member 32 integrally formed with the first housing 31. The first housing 31 is disposed on the outer side of the terminal module 2. One end of the grounding sheet 22 abuts against the inner wall of the first housing 31. The other end of the grounding sheet 22 is configured to connect a docking grounding terminal of the docking connector. The grounding connection member 32 is configured to connect the shielding layer 101 of the cable 10.

In the electrical connector provided in this embodiment, the conductive module is configured to implement the electrical connection between the docking connector and the core wire 102 of the cable 10. In this manner, data transmission is implemented. One end of the grounding sheet 22 abuts against the inner wall of the first housing 31. The other end of the grounding sheet 22 is configured to connect the docking grounding terminal of the docking connector. The first housing 31 is connected to the grounding connection member 32. The grounding connection member 32 is connected to the shielding layer 101 of the cable 10, which plays the role of grounding and interference shielding. The first housing 31 is integrally formed with the grounding connection member 32, and the connection strength is high. The grounding sheet 32 abuts against the inner wall of the first housing 31. In this manner, a notch does not need to be formed as in the related art. Thus, the reliability of the connection between the grounding sheet 22 and the shielding housing 3 is ensured, and the grounding shielding effect is better.

In an embodiment, as shown in FIGS. 1 and 2, the shielding housing 3 also includes a second housing 33. One end of the second housing 33 sleeves the outer side of the cable 10, and the other end of the second housing 33 sleeves the outer side of the first housing 31. That is, the second housing 33 dads the outer side of the connection between the cable 10 and the terminal module 2.

Figure 5:
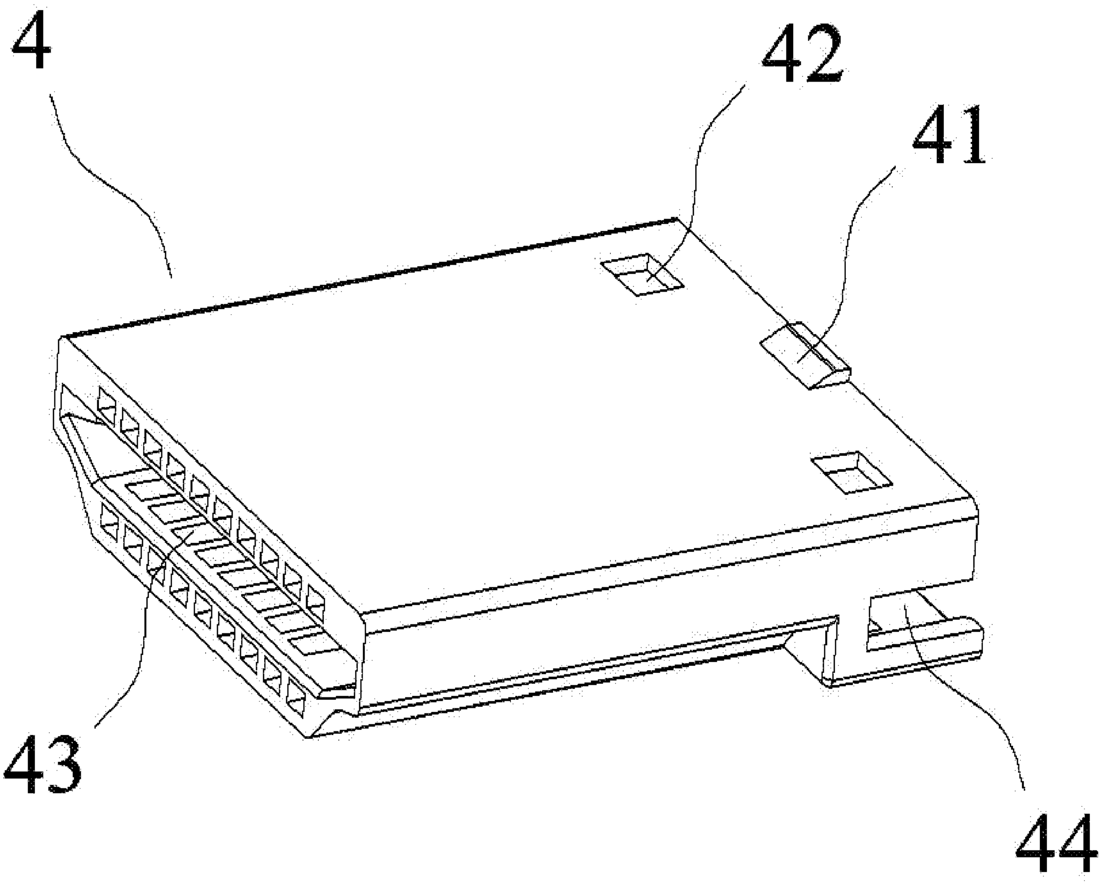
FIG. 5 is a view illustrating the structure of an insulator according to an embodiment of the present disclosure.

In an embodiment, as shown in FIGS. 2 and 5, the electrical connector also includes an insulator 4. Part of the conductive module is disposed in the insulator 4. The first housing 31 dads the outer side of the insulator 4. A mounting through groove 43 is formed through the insulator 4 in a first direction. Part of the conductive module is disposed through the insulator 4. A gap 44 communicating with the outside is formed on the inner wall of the mounting through groove 43. One end of the grounding sheet 22 extends through the gap 44 and then abuts against the inner wall of the first housing 31.

Figure 6:
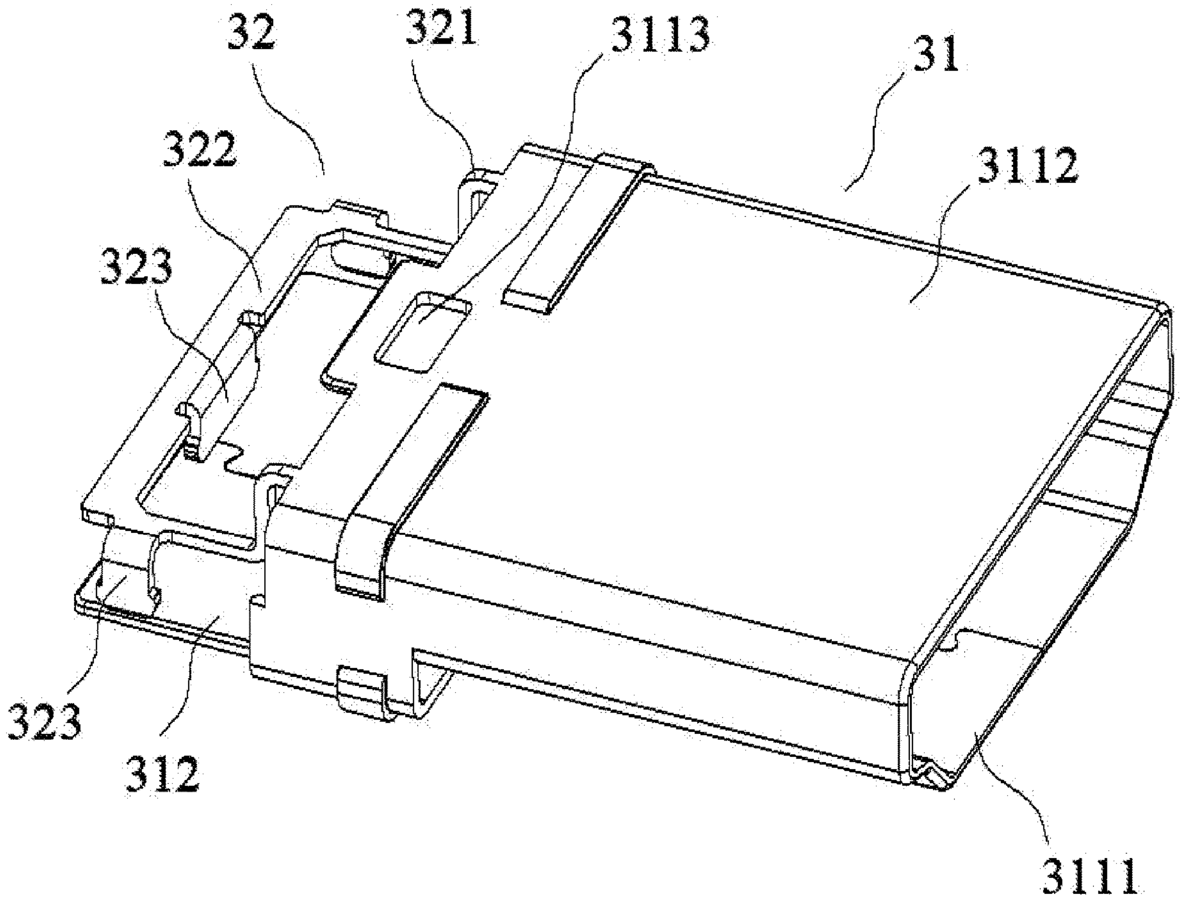
FIG. 6 is a view illustrating the structure of a first housing according to an embodiment of the present disclosure.

As shown in FIGS. 5 and 6, the outer sidewall of the insulator 4 is provided with a first positioning protrusion 41. The side wall of the first housing 31 is formed with a first positioning groove 3113. The insulator 4 is disposed in the first housing 31, and the first positioning protrusion 41 is positioned in the first positioning groove 3113, so that the firmness of the connection between the insulator 4 and the first housing 31 is ensured.

Figure 7:
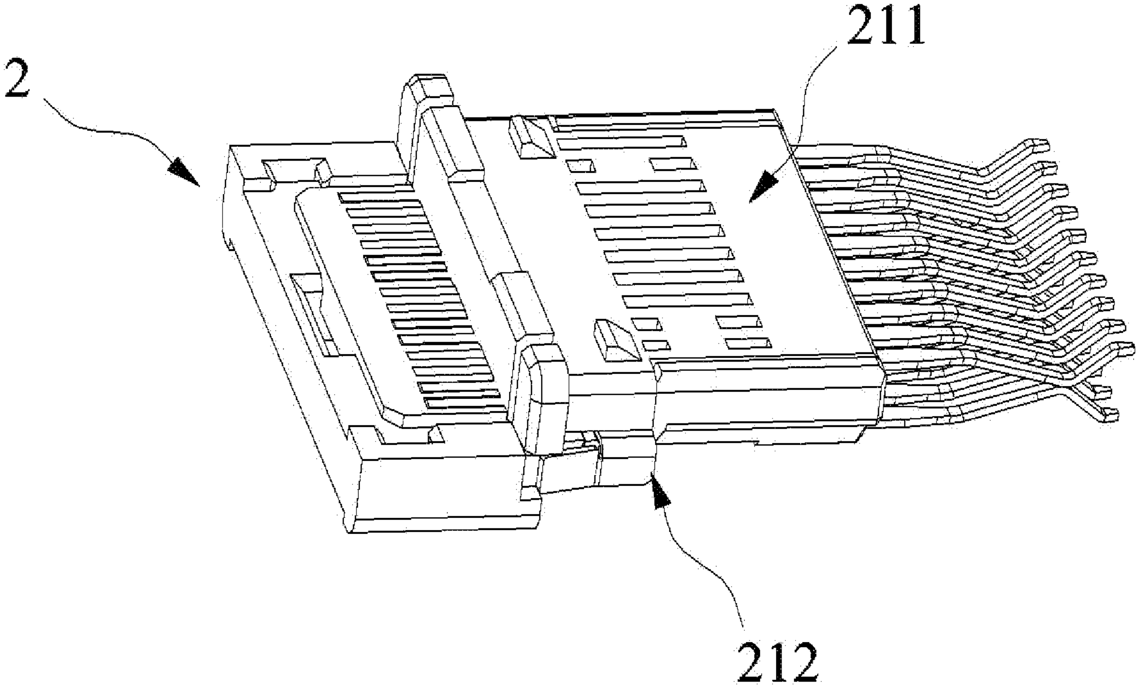
FIG. 7 is a view illustrating the structure of a terminal module according to an embodiment of the present disclosure.
Figure 8:
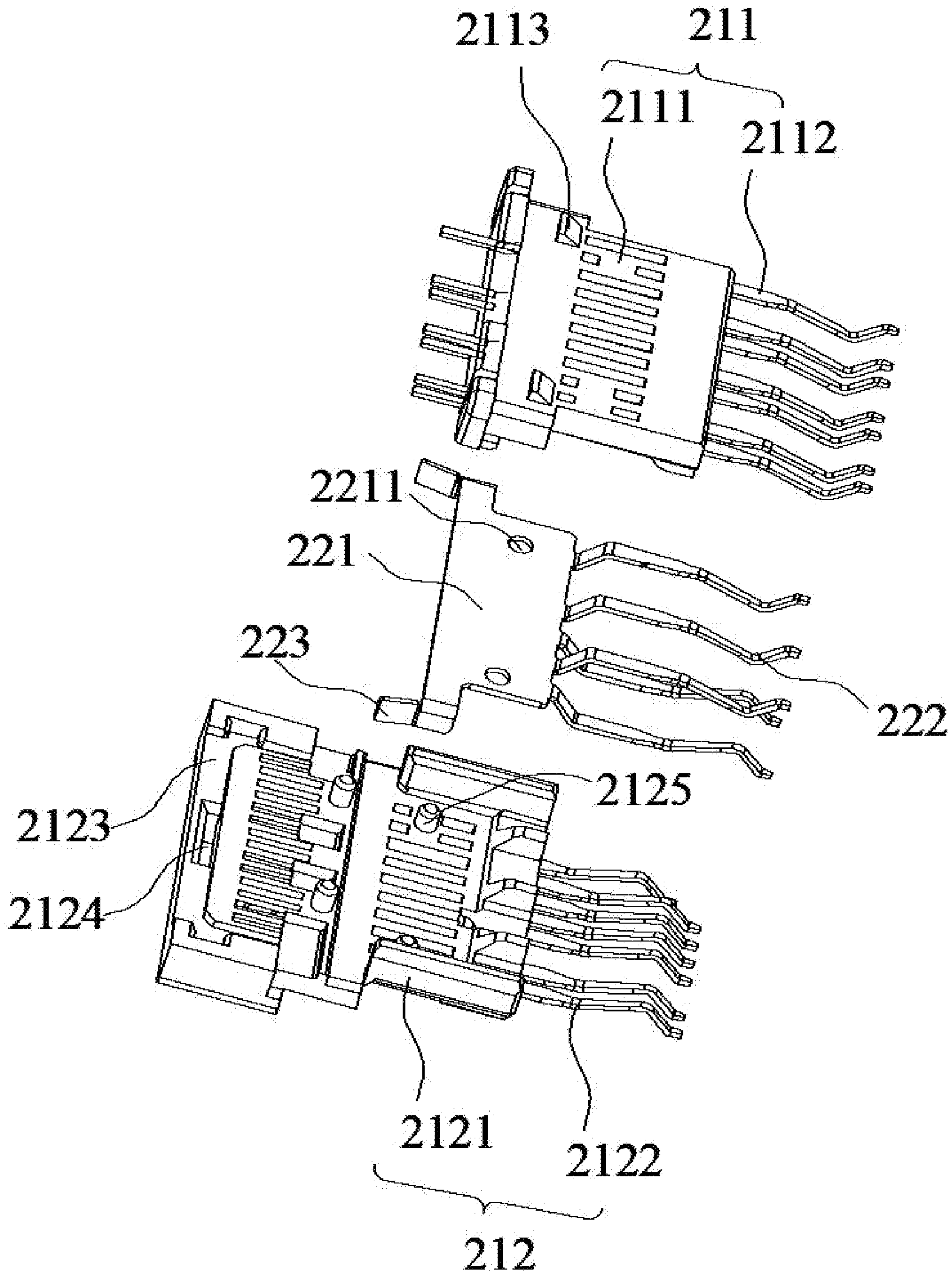
FIG. 8 is an exploded view of the terminal module according to an embodiment of the present disclosure.

In an embodiment, as shown in FIGS. 7 and 8, the conductive module includes a first module 211 and a second module 212. The first module 211 is connected to the second module 212. At least part of the grounding sheet 22 is disposed between the first module 211 and the second module 212.

In an embodiment, with continued reference to FIGS. 7 and 8, the first module 211 includes a first insulating fixed block 2111 and multiple first conductive terminals 2112 fixed on the first insulating fixed block 2111. In this embodiment, the multiple first conductive terminals 2112 are embedded in the first insulating fixed block 2111. The multiple first conductive terminals 2112 are sequentially distributed at intervals in a second direction. The second direction is perpendicular to the first direction. Accordingly, the second module 212 includes a second insulating fixed block 2121 and multiple second conductive terminals 2122 fixed to the second insulating fixed block 2121. In this embodiment, the multiple second conductive terminals 2122 are embedded in the second insulating fixed block 2121. The first insulating fixed block 2111 is connected to the second insulating fixed block 2121. The multiple second conductive terminals 2122 are sequentially distributed at intervals in the second direction.

In an embodiment, with continued reference to FIGS. 7 and 8, one of the first insulating fixed block 2111 or the second insulating fixed block 2121 is provided with multiple first positioning pins 2125, and the other of the first insulating fixed block 2111 or the second insulating fixed block 2121 is provided with multiple second positioning holes. The multiple first positioning pins 2125 are disposed in the multiple second positioning holes in a one-to-one correspondence, so that the first insulating fixed block 2111 and the second insulating fixed block 2121 are firmly fixed. In this embodiment, two second positioning holes are formed on the first insulating fixed block 2111. Two first positioning pins 2125 are disposed in the second insulating fixed block 2121. Part of the grounding sheet 22 is interposed between the first insulating fixed block 2111 and the second insulating fixed block 2121. The grounding sheet 22 is formed with two first positioning holes 2211. A first positioning pin 2125 extends through a first positioning hole 2211 and then extends into a second positioning hole, and at the same time, the grounding sheet 22 is fixed.

More specifically, as shown in FIGS. 5 and 8, the first insulating fixed block 2111 and the second insulating fixed block 2121 are each provided with multiple second positioning protrusions 2113. The insulator 4 is formed with multiple second positioning grooves 42. Each second positioning protrusion 2113 is correspondingly disposed in one second positioning groove 42. In this manner, the firmness of the connection between the first insulating fixed block 2111 and the second insulating fixed block 2121 is ensured.

In an embodiment, the grounding sheet 22 includes a main body portion 221, multiple grounding terminals 222, and two elastic abutment portions 223. One end of one grounding terminal 222 is connected to one side of the main body portion 221, and the other end of the one grounding terminal 222 is configured to connect the docking grounding terminal of the docking connector. The multiple grounding terminals 222 are sequentially distributed at intervals in the second direction. The two elastic abutment portions 223 are disposed at two ends of the other side of the main body portion 221 facing away from the one grounding terminal 222 separately and elastically abut against two opposite inner walls of the first housing 31 separately. In this embodiment, an elastic abutment portion 223 extends through the gap 44 and then abuts against an inner wall of the first housing 31. The main body portion 221 is formed with two first positioning holes 2211. The grounding sheet 22 is made of a metal material and is an integrally formed structure.

In an embodiment, one end of each of the two elastic abutment portions 223 is connected to the main body portion 221, and the other end of each elastic abutment portion 223 extends obliquely in a direction in which one elastic abutment portion 223 faces away from the other elastic abutment portion 223. With this arrangement, the elastic abutment portions 223 elastically abut against the first housing 31, and the stability of the electrical connection between the elastic abutment portions 223 and the first housing 31 is ensured.

As shown in FIGS. 7 and 8, the length of the second insulating fixed block 2121 in the first direction is greater than the length of the first insulating fixed block 2111 in the first direction. That is, the first insulating fixed block 2111 docks to part of the second insulating fixed block 2121, and the other part of the second insulating fixed block 2121 exceeds the first insulating fixed block 2111. The end of the first conductive terminals 2112 facing the cable 10 and the end of the second conductive terminals 2122 facing the cable 10 are accommodated in the other part of the second insulating fixed block 2121. Multiple core wires 102 of the cable 10 are welded to the end of the first conductive terminals 2112 and the end of the second conductive terminals 2122.

In an embodiment, as shown in FIG. 6, the grounding connection member 32 includes a first connection portion 321 and a second connection portion 322. One end of the first connection portion 321 is connected to the sidewall of the first housing 31, and the other end of the first connection portion 321 extends towards the inside of the first housing 31 and is connected to the second connection portion 322. The second connection portion 32 is connected to the shielding layer 101 of the cable 10. The first connection portion 321 is configured to position the second connection portion 322 on the extension channel of the cable 10 to implement the connection to the shielding layer 101 of the cable 10.

In an embodiment, with continued reference to FIG. 6, the first housing 31 includes a sleeve structure and an extension plate 312. The sleeve structure includes a first side plate 3111 and a second side plate 3112 disposed opposite to each other. The extension plate 312 is connected to an end of the first side plate 3111. The grounding connection member 32 is connected to the end of the second side plate 3112 adjacent to the extension plate 312. The conductive module extends from the inside of the sleeve structure to a side of the extension plate 312. Since the first housing 31 is integrally formed with the grounding connection member 32, and the connection strength between the two is high, a housing is not required to be disposed around the periphery of the grounding connection member 32 to ensure the firmness of the fixing of the grounding connection member 32, that is, the second side plate 3112 and the other two side plates are omitted to be provided with an extended plate which forms a housing with the extension plate 312, thereby saving materials. In this embodiment, the part of the second insulating fixed block 2121 corresponding to the first insulating fixed block 2111 is disposed in the sleeve structure of the first housing 31, and the part beyond the first insulating fixed block 2111 is disposed on the extension plate 312.

In an embodiment, with continued reference to FIG. 6, the grounding connection member 32 includes two first connection portions 321. The second connection portion 322 is in a U-shaped structure. Two ends of the U-shaped structure are connected to the two first connection portions 321 in a one-to-one correspondence. This structure ensures the firmness of the connection between the grounding connection member 32 and the first housing 31. As shown in FIGS. 6 and 8, the end of the first conductive terminals 2112 connected to the cable 10 and the end of the second conductive terminals 2122 connected to the cable 10 are in the U-shaped space of the second connection portion 322. The structural arrangement is reasonable, and it is convenient to implement the connection to the cable 10.

More specifically, as shown in FIGS. 6 and 8, the conductive module is formed with an accommodating groove 2123. The second connection portion 322 is accommodated in the accommodating groove 2123. With this arrangement, the firmness of the fixing of the grounding connection member 32 is further ensured. In this embodiment, the second insulating fixed block 2121 of the second module 212 is formed with an accommodating groove 2123.

Further, specifically, with continued reference to FIGS. 6 and 8, the grounding connection member 32 also includes multiple positioning portions 323. The positioning portions 323 are connected to the end of the second connection portion 322 away from the first connection portion 321. Multiple positioning grooves 2124 are formed in the groove bottom of the accommodating groove 2123. The multiple positioning portions 323 are disposed in the multiple positioning grooves 2124 in a one-to-one correspondence. With this arrangement, the firmness of the fixing of the grounding connection member 32 is further improved. In this embodiment, each of the three sides of the second connection portion 322 in the U-shaped structure is provided with a sheet-shaped positioning portion 323. Accordingly, three positioning grooves 2124 are formed, and the three positioning grooves 2124 are strip-shaped grooves.

Apparently, the preceding embodiments of the present disclosure are merely illustrative examples of the present disclosure and are not intended to limit the implementations of the present disclosure. For those of ordinary skill in the art, changes or alterations in other different forms may also be made based on the preceding description. All implementations cannot be and do not need to be exhausted herein. Any modifications, equivalent substitutions, and improvements made within the spirit and principle of the present disclosure fall within the scope of the claims of the present disclosure.

What is claimed is:

1. An electrical connector, comprising:

a terminal module comprising a conductive module and a grounding sheet, wherein one end of the conductive module is configured to connect to a docking conductive terminal of a docking connector, and another end of the conductive module is configured to connect to a core wire of a cable; and a shielding housing comprising a first housing and a grounding connection member integrally formed with the first housing, wherein the first housing is disposed on an outer side of the terminal module, one end of the grounding sheet abuts against an inner wall of the first housing, another end of the grounding sheet is configured to connect to a docking grounding terminal of the docking connector, and the grounding connection member is configured to connect to a shielding layer of the cable, wherein the grounding connection member comprises a first connection portion and a second connection portion, wherein one end of the first connection portion is connected to the first housing, another end of the first connection portion extends towards an inside of the first housing and is connected to the second connection portion, and the second connection portion is configured to connect to the shielding layer of the cable, wherein the conductive module is provided with an accommodating groove, and the second connection portion is accommodated in the accommodating groove, wherein the grounding connection member further comprises a plurality of positioning portions, the plurality of positioning portions are connected to an end of the second connection portion facing away from the first connection portion, a plurality of positioning grooves are provided in a groove bottom of the accommodating groove, and the plurality of positioning portions are disposed in the plurality of positioning grooves in a one-to-one correspondence.

2. The electrical connector according to claim 1, wherein the grounding connection member comprises two first connection portions, the second connection portion is in a U-shaped structure, and two ends of the U-shaped structure are connected to the two first connection portions in a one-to-one correspondence.

3. The electrical connector according to claim 1, wherein the grounding sheet comprises:

a main body portion;

a plurality of grounding terminals, wherein one end of a grounding terminal of the plurality of grounding terminals is connected to a side of the main body portion, another end of the grounding terminal is configured to connect to the docking grounding terminal of the docking connector, and the plurality of grounding terminals are sequentially distributed at intervals; and two elastic abutment portions disposed at two ends of another side of the main body portion facing away from the grounding terminal separately and elastically abut against two opposite inner walls of the first housing separately.

4. The electrical connector according to claim 3, wherein one end of each of the two elastic abutment portions is connected to the main body portion, and another end of the each elastic abutment portion extends obliquely in a direction in which one of the two elastic abutment portions faces away from another of the two elastic abutment portions.

5. The electrical connector according to claim 4, wherein a plurality of first positioning holes are provided in the main body portion, a plurality of first positioning pins are provided on the terminal module, and the plurality of first positioning pins are disposed in the plurality of first positioning holes in a one-to-one correspondence.

6. The electrical connector according to claim 1, wherein the first housing comprises a sleeve structure and an extension plate, wherein the sleeve structure comprises a first side plate and a second side plate disposed opposite to each other, the extension plate is connected to an end of the first side plate, the grounding connection member is connected to an end of the second side plate adjacent to the extension plate, and the conductive module extends from an inside of the sleeve structure to a side of the extension plate.

7. A cable connector, comprising a cable and further comprising an electrical connector, wherein a shielding layer of the cable is connected to a grounding connection member of the electrical connector, and a core wire of the cable is connected to a conductive module of the electrical connector, wherein the electrical connector comprises:

a terminal module comprising the conductive module and a grounding sheet, wherein one end of the conductive module is configured to connect to a docking conductive terminal of a docking connector, and another end of the conductive module is configured to connect to the core wire of the cable; and a shielding housing comprising a first housing and the grounding connection member integrally formed with the first housing, wherein the first housing is disposed on an outer side of the terminal module, one end of the grounding sheet abuts against an inner wall of the first housing, another end of the grounding sheet is configured to connect to a docking grounding terminal of the docking connector, and the grounding connection member is configured to connect to the shielding layer of the cable, wherein the grounding connection member comprises a first connection portion and a second connection portion, wherein one end of the first connection portion is connected to the first housing, another end of the first connection portion extends towards an inside of the first housing and is connected to the second connection portion, and the second connection portion is configured to connect to the shielding layer of the cable, wherein the conductive module is provided with an accommodating groove, and the second connection portion is accommodated in the accommodating groove, wherein the grounding connection member further comprises a plurality of positioning portions, the plurality of positioning portions are connected to an end of the second connection portion facing away from the first connection portion, a plurality of positioning grooves are provided in a groove bottom of the accommodating groove, and the plurality of positioning portions are disposed in the plurality of positioning grooves in a one-to-one correspondence.

8. The cable connector according to claim 7, wherein the grounding connection member comprises two first connection portions, the second connection portion is in a U-shaped structure, and two ends of the U-shaped structure are connected to the two first connection portions in a one-to-one correspondence.

9. The cable connector according to claim 7, wherein the grounding sheet comprises:

a main body portion;

a plurality of grounding terminals, wherein one end of a grounding terminal of the plurality of grounding terminals is connected to a side of the main body portion, another end of the grounding terminal is configured to connect to the docking grounding terminal of the docking connector, and the plurality of grounding terminals are sequentially distributed at intervals; and two elastic abutment portions disposed at two ends of another side of the main body portion facing away from the grounding terminal separately and elastically abut against two opposite inner walls of the first housing separately.

10. The cable connector according to claim 9, wherein one end of each of the two elastic abutment portions is connected to the main body portion, and another end of the each elastic abutment portion extends obliquely in a direction in which one of the two elastic abutment portions faces away from another of the two elastic abutment portions.

11. The cable connector according to claim 10, wherein a plurality of first positioning holes are provided in the main body portion, a plurality of first positioning pins are provided on the terminal module, and the plurality of first positioning pins are disposed in the plurality of first positioning holes in a one-to-one correspondence.

12. The cable connector according to claim 7, wherein the first housing comprises a sleeve structure and an extension plate, wherein the sleeve structure comprises a first side plate and a second side plate disposed opposite to each other, the extension plate is connected to an end of the first side plate, the grounding connection member is connected to an end of the second side plate adjacent to the extension plate, and the conductive module extends from an inside of the sleeve structure to a side of the extension plate.

13. An electrical connector, comprising:

a terminal module comprising a conductive module and a grounding sheet, wherein one end of the conductive module is configured to connect to a docking conductive terminal of a docking connector, and another end of the conductive module is configured to connect to a core wire of a cable; and a shielding housing comprising a first housing and a grounding connection member integrally formed with the first housing, wherein the first housing is disposed on an outer side of the terminal module, one end of the grounding sheet abuts against an inner wall of the first housing, another end of the grounding sheet is configured to connect to a docking grounding terminal of the docking connector, and the grounding connection member is configured to connect to a shielding layer of the cable, wherein the grounding sheet comprises:

a main body portion;

a plurality of grounding terminals, wherein one end of a grounding terminal of the plurality of grounding terminals is connected to a side of the main body portion, another end of the grounding terminal is configured to connect to the docking grounding terminal of the docking connector, and the plurality of grounding terminals are sequentially distributed at intervals; and two elastic abutment portions disposed at two ends of another side of the main body portion facing away from the grounding terminal separately and elastically abut against two opposite inner walls of the first housing separately, wherein one end of each of the two elastic abutment portions is connected to the main body portion, and another end of the each elastic abutment portion extends obliquely in a direction in which one of the two elastic abutment portions faces away from another of the two elastic abutment portions.

14. The electrical connector according to claim 13, wherein a plurality of first positioning holes are provided in the main body portion, a plurality of first positioning pins are provided on the terminal module, and the plurality of first positioning pins are disposed in the plurality of first positioning holes in a one-to-one correspondence.

* * * * *